(12) United States Patent
Mueller

(10) Patent No.: US 10,946,467 B2
(45) Date of Patent: Mar. 16, 2021

(54) ADAPTER MECHANISM AND A RELATED SYSTEM FOR A WELDING APPARATUS

(71) Applicant: M5 Scientific Glass Blowing, Inc., Mooresville, NC (US)

(72) Inventor: Eric R. Mueller, Mooresville, NC (US)

( * ) Notice: Subject to any disclaimer, the term of this patent is extended or adjusted under 35 U.S.C. 154(b) by 432 days.

(21) Appl. No.: 15/898,743

(22) Filed: Feb. 19, 2018

(65) Prior Publication Data

US 2018/0272455 A1 Sep. 27, 2018

Related U.S. Application Data

(60) Provisional application No. 62/460,521, filed on Feb. 17, 2017.

(51) Int. Cl.
*B23K 9/32* (2006.01)
*B23K 9/29* (2006.01)

(52) U.S. Cl.
CPC .............. *B23K 9/328* (2013.01); *B23K 9/291* (2013.01)

(58) Field of Classification Search
CPC . B23K 9/16; B23K 9/26; B23K 9/325; B23K 9/328; B23K 9/291
USPC ....... 219/74, 137.31; 138/109, 155; 285/351
See application file for complete search history.

(56) References Cited

U.S. PATENT DOCUMENTS

| | | | | |
|---|---|---|---|---|
| 2,872,563 A | * | 2/1959 | Thorp | B23K 9/291 219/75 |
| 3,610,875 A | * | 10/1971 | Dal Molin | B23K 9/291 219/137.63 |
| 3,659,076 A | * | 4/1972 | Ogden, Sr. | B23K 9/295 219/137.42 |
| 4,554,432 A | * | 11/1985 | Raloff | B23K 9/295 219/137.43 |
| 5,711,552 A | * | 1/1998 | Hogue | F16L 37/24 285/319 |

* cited by examiner

*Primary Examiner* — David J Walczak
(74) *Attorney, Agent, or Firm* — Ronald L. Hofer

(57) ABSTRACT

A system for a welding apparatus including a welding cup; a hollow tubular adapter body extending longitudinally from a first end to a second end, an external surface of the adapter body defining one or more grooves extending about a circumference thereof and longitudinally disposed between the first and second end; and one or more O-rings configured to be installed about the adapter body and received in each of the one or more grooves; wherein the first end or the second end of the adapter body is engageable with a welding torch head and wherein the welding cup is configured to receive the other of the first end and the second end of the adapter body therein, the welding cup extending longitudinally along the adapter body such that the one or more O-rings is disposed between the adapter body and the welding cup.

17 Claims, 2 Drawing Sheets

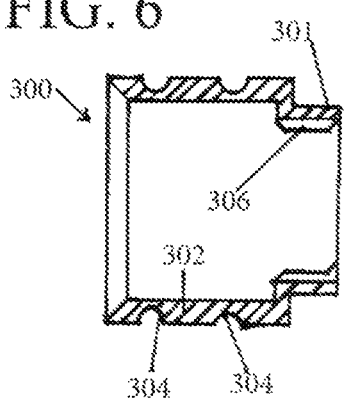
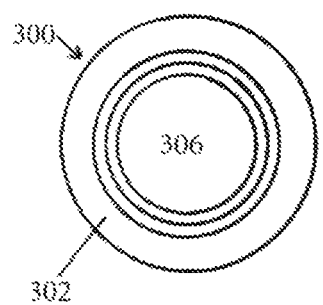
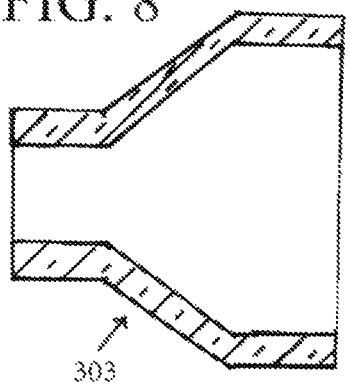
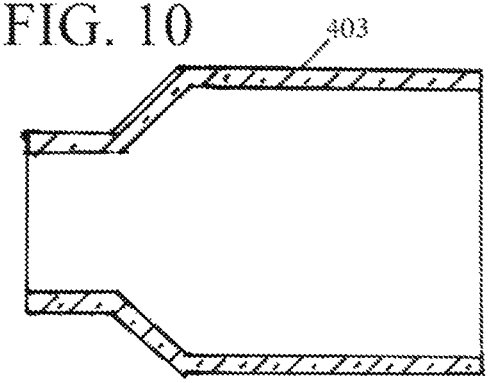
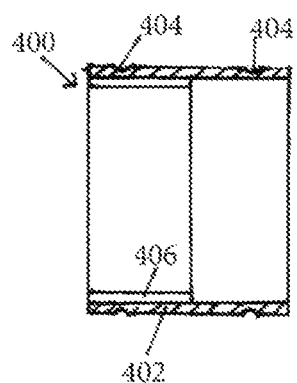
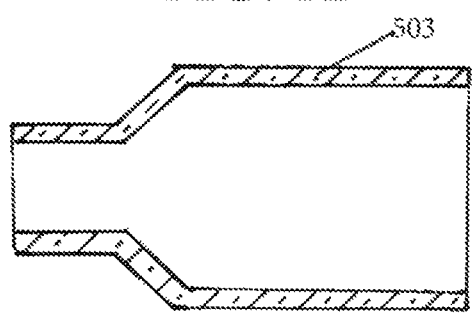
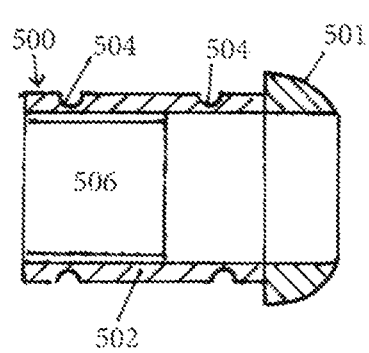

ADAPTER MECHANISM AND A RELATED SYSTEM FOR A WELDING APPARATUS

CROSS REFERENCE TO RELATED APPLICATIONS

This application claims the benefit of provisional patent application No. 62/460,521 filed Feb. 17, 2018 by Eric R. Mueller which is incorporated by reference herein in its entirety.

TECHNOLOGICAL FIELD

The present disclosure relates generally to welding. More particularly, the present disclosure relates to an adapter mechanism and a related system for a welding apparatus.

BACKGROUND OF THE INVENTION

Welding cups are used with welding torches such as Gas tungsten arc welding (GTAW) torches and tungsten inert gas (TIG) welding torches. It has been found advantageous to use welding cups made of transparent or semi-transparent material to allow the welder to see his work during the welding process. Clear material used such as glass is easily manipulated and customized to optimize the process for the end user, in comparison with the current mass produced Alumina or ceramic GTAW cups on the market.

Suitable welding cups can be made of glass but it is somewhat problematic to attach the glass welding cup to the welding torch because it is too difficult to cut threads into the glass welding cup because the glass material is hard and sometimes brittle. Another factor for cutting threads is cost effectiveness. Thus, it would be beneficial to have an adapter which could join a glass welding cup to a welding torch in an economic and useful manner. Such an adapter is provided by the present invention which is disclosed in the following specification and accompanying drawings.

SUMMARY OF THE INVENTION

An adapter mechanism for a welding apparatus using a glass welding cup has a hollow tubular adapter body extending longitudinally from a first end to a second end, an internal surface of the adapter body having a threaded engagement member and an external surface of the adapter body defining one or more grooves extending about a circumference thereof and longitudinally disposed between the first and second end. A system for a welding apparatus including a glass welding cup comprises the adapter mechanism and one or more O-rings configured to be installed about the adapter body and received in each of the one or more grooves; wherein the first end or the second end of the adapter body is engageable with a welding torch head and wherein the welding cup is configured to receive the other of the first end and the second end of the adapter body therein, the welding cup extending longitudinally along the adapter body such that the one or more O-rings is disposed between the adapter body and the welding cup.

BRIEF DESCRIPTION OF THE DRAWING(S)

Having thus described example implementations of the disclosure in general terms, reference will now be made to the accompanying drawings, which are not drawn to scale, and wherein:

FIG. 6 is a longitudinal cross-sectional view of an alternative embodiment of an adapter mechanism of the present invention;

FIG. 7 is a front elevational view of the adapter mechanism of FIG. 5;

FIG. 8 is a longitudinal cross-sectional view of a glass welding cup suitable for use with the adapter mechanism of FIG. 6;

FIG. 9 is a longitudinal cross-sectional view of another alternative embodiment of an adapter mechanism of the present invention;

FIG. 10 is a side elevational view of a glass welding cup suitable for use with the adapter mechanism of FIG. 9;

FIG. 11 is a longitudinal cross-sectional view of another alternative embodiment of an adapter mechanism of the present invention; and FIG. 12 is a side elevational view of a glass welding cup suitable for use with the adapter mechanism of FIG. 11;

DETAILED DESCRIPTION OF THE INVENTION

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art.

Figure 1:
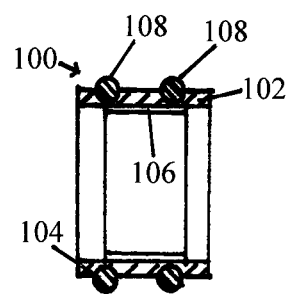
FIG. 1 is a longitudinal cross-sectional view of an embodiment of an adapter mechanism of the present invention.
Figure 2:
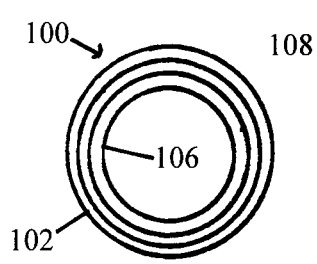
FIG. 2 is a front elevational view of the adapter mechanism of FIG. 1.
Figure 3:
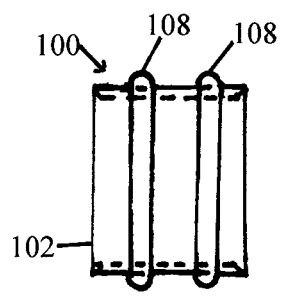
FIG. 3 is a side elevational view of the adapter mechanism of FIG. 1.

Now referring to FIGS. 1 to 3, an exemplary embodiment of an adapter mechanism for a welding apparatus is shown and indicated generally by the numeral 100. Adapter mechanism 100 is suitable for use with welding apparatus such as gas tungsten arc welding (GTAW) torches or tungsten inert gas (TIG) welding torches using a non-consumable tungsten electrode to produce a weld. Some exemplary TIG welding torches include a WP-9 TIG torch, a WP-20 TIG torch, a WP-25 TIG torch, etc. Other exemplary TIG welding torches include a WP-17F TIG torch, a WP-18 water cooled TIG torch, and a WP-26FV TIG torch. Other exemplary welding torches not specifically disclosed hereby are also contemplated by this disclosure and are compatible with the adapter mechanism assembly and/or systems described herein.

The adapter mechanism 100 shown in FIGS. 1 to 3 comprises a hollow tubular adapter body 102 extending longitudinally from a first end to a second end. Adapter body 100 is engageable between a welding torch head and a welding cup. More particularly, as provided herein, the phrase "a welding torch head" refers to a collet body or a gas lens of a TIG welding torch or the like. In some aspects, an external surface of the adapter body 102 defines one or more grooves 104 extending about a circumference thereof and longitudinally disposed between the first and second end. The adapter body 102 can be comprised of, for example, aluminum, brass, steel, stainless steel, different grades thereof, etc. More particularly, for example, the adapter body 102 is comprised of 6061 aluminum.

An internal surface of the adapter body 102, in some aspects, defines an engagement member between the first end and the second, opposing end for engaging the first end or the second, opposing end of the adapter body 102 with a welding torch head and engaging the other of the second, opposing end or the first end of the adapter body 102 with a welding cup. More particularly, an engagement member such as a threaded engagement member 106 extends about a circumference of the internal surface of the adapter body 102 and is longitudinally disposed between the first and second end of the adapter body 102. For example, the threaded engagement member 106 comprises a 9/16-18 UNF 2A sized thread, a 3/4-16 NF sized thread, a 7/16-16 UN sized thread, a 3/8-24 THD sized thread, etc., that is configured to threadingly engage threads on a collet body or gas lens of a conventional welding torch head (e.g., GTAW/TIG welding torch.) Other thread sizes are also contemplated. The engagement member is designed to thread directly onto an existing collet body or gas lens (e.g., 208, FIG. 4-5) of the welding torch. The threads shown in FIGS. 1-3 are placed in the center of the adapter for a fit onto the collet body in either direction.

In some aspects, the adapter body 102 comprises a length, internal diameter, and external diameter of sizes engageable with a variety of welding cups and/or collet bodies and gas lenses of standard TIG welding torches. More particularly, in some instances, the adapter body 102 is configured to be engaged with a gas lens or a collet body of a WP-9 TIG torch, a WP-20 TIG torch, a WP-25 TIG torch, and the like. Likewise, in other instances, the adapter body 102 is configured to be engaged with a gas lens or a collet body of a WP-17F TIG torch, a WP-18 water cooled TIG torch, and a WP-26FV TIG torch.

More particularly, the adapter body 102 comprises a length of between about 10 and about 25 millimeters, an internal diameter of between about 10 and about 19 millimeters, and an external diameter of between about 12 and about 21 millimeters. For example, the adapter body 102 comprises a length of about 12.19 millimeters, an internal diameter of about 14.22 millimeters, and an external diameter of about 16.76 millimeters.

In another example, the adapter body 102 comprises a length of about 20.80 millimeters, an internal diameter of about 18.77 millimeters, and an external diameter of about 20.80 millimeters. It will be understood to those of skill in the art that other sizes and dimensions can be used to accommodate welding torch heads having varying sizes.

The external surface of the adapter body 102, in some aspects, defines two grooves 104 extending about the circumference thereof and that are in spaced apart relation to one another about the external surface of the adapter body 102, each of the grooves 104 being configured to receive an O-ring 108 or other type of gasket member. For example, the grooves comprise a radius of between about 1.7 and about 1.8 millimeters; more particularly, the grooves comprise a radius of 1.78 millimeters. In other examples, the grooves have a radius of between about 1.7 and about 16 millimeters.

In some aspects, one or more O-rings 108 are configured to be installed about the adapter body 102 and received in each of the one or more grooves 104. The O-rings 108 comprise, in some aspects, a flexible material, such as a polyamide. Preferably two or more O-rings are used to provide a gas tight seal between the adapter and the glass welding cup. Two O-rings (or more) have been found advantageous to automatically center the glass welding cup on the tungsten of the welding torch.

In other aspects, one or more O-rings 108 are integral to the adapter body 102, such that the O-rings 108 are permanently engaged with the grooves 104 of the adapter body 102. Likewise, in some aspects, a thermal spacer (e.g., 206, FIGS. 4-5) is integral to the adapter body 102, such that the thermal spacer is permanently engaged therewith. In such instances, for example, one or both of the O-rings 108 and the thermal spacer are provided with the adapter body 102 for easy and efficient assembly of the adapter body 102 with the welding cup(s) and the torch head.

Figure 4:
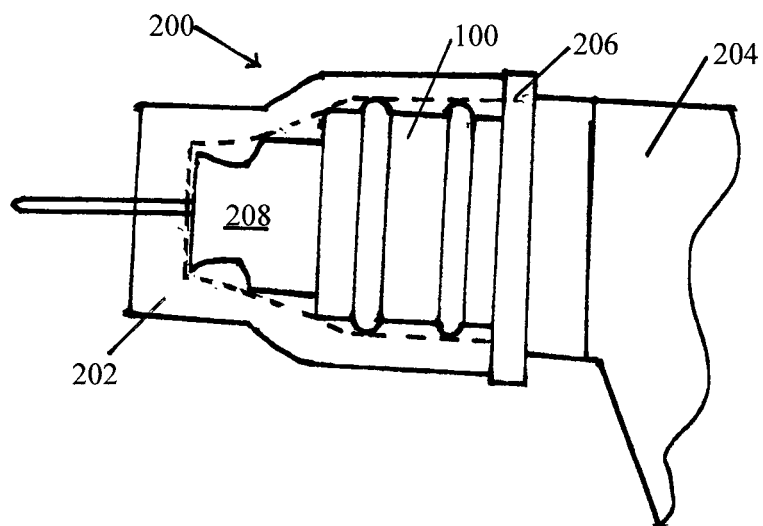
FIG. 4 is a side elevation of a welding system comprising the adapter mechanism of FIGS. 1-3 in operative association with a glass welding cup and a welding torch, shown broken away.
Figure 5:
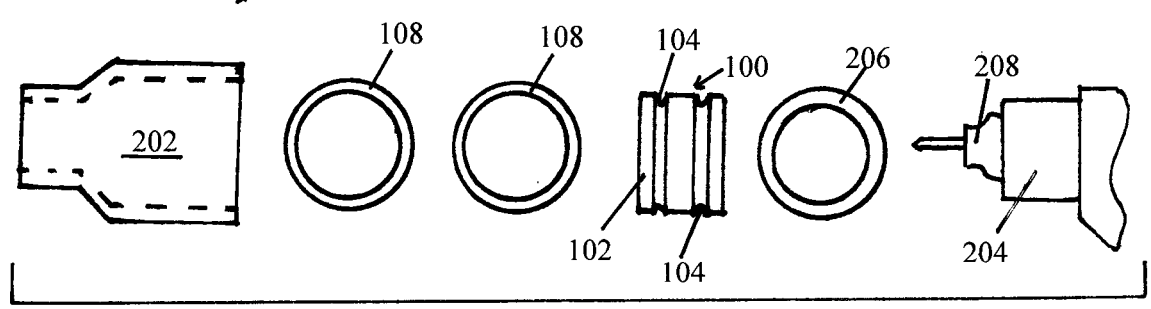
FIG. 5 is an exploded view of the welding system of FIG. 4.

FIGS. 4 and 5 illustrate a system, indicated generally by the numeral 200, for a welding apparatus. System 200 for a welding apparatus comprises welding cup 202 having opposed first and second ends and hollow tubular adapter body 102 extending longitudinally from a first end to a second end. An external surface of the adapter body 102 defines one or more grooves extending about a circumference thereof and longitudinally disposed between the first and second end. The system 200 further comprises one or more O-rings 108 configured to be installed about the adapter body 102 and received in each of the one or more grooves. In the system 200, the first end or the second end of the adapter body 102 is engageable with a welding torch head 204 of, for example, a TIG welding torch, and one of the first and second ends of welding cup 202 is configured to receive the other of the first end and the second end of adapter body 102 therein, the welding cup 202 extending longitudinally along the adapter body 102 such that the one or more O-rings 108 is disposed between adapter body 102 and welding cup 202.

The welding cup 202 comprises an acrylic glass, a sapphire, a borosilicate, a quartz, or any other non-crystalline amorphous solid having a substantially transparent characteristic. The transparency of the welding cup 202 enables a more accurate and precise weld as a user of the weld torch has the ability to see the weld through the welding cup 202. In some aspects, one of the first end or the second end of the welding cup defines an orifice comprising a ½ inch diameter (#8), a 7/16 inch diameter (#7), a 3/8 inch diameter (#6), 5/16 inch diameter (#5), or a ¼ inch diameter (#4). Other diameters are also contemplated.

In some aspects, the system 200 further comprises a thermal spacer 206 engaged with the second end of the welding cup 202 for creating a seal between the second end of the welding cup 202 and the welding torch head 204.

Now referring to FIGS. 6 to 8, an alternative embodiment of an adapter mechanism is shown and indicated generally by the numeral 300. Adapter mechanism 300 has an end section 301 with a reduced radius as compared to the rest of the body 302, which end section has internal threads 306. Body 302 has external grooves 304 for O-rings (not shown in the Figures) analogous to body 102, grooves 104 and O-rings 108. Adapter mechanism 300 can be used, for example, with a glass cup 303 in a manner analogous to adapter mechanism 100 and glass cup 202.

Another alternative embodiment of an adapter mechanism is shown in FIGS. 9 and 10 and indicated generally by the numeral 400. Body 402 of adapter mechanism 400 has internal threads 406 and external grooves 404 for O-rings (not shown in the Figures) analogous to body 102, grooves 104 and O-rings 108. Adapter mechanism 400 can be used, for example, with a glass cup 403 in a manner analogous to adapter mechanism 100 and glass cup 202.

Yet another alternative embodiment of an adapter mechanism is shown in FIGS. 11 and 12 and indicated generally by the numeral 500. Adapter mechanism 500 has an end section 501 with an enlarged head and has internal threads 506. Body 502 has external grooves 504 for O-rings (not shown in the Figures) analogous to body 102, grooves 104 and O-rings 108. Adapter mechanism 500 can be used, for example, with a glass cup 503 in a manner analogous to adapter mechanism 100 and glass cup 202.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An adapter mechanism for a welding apparatus having a welding torch head and a welding cup, comprising:
    a hollow tubular adapter body extending longitudinally from a first end to a second end, an external surface of the adapter body defining a pair of grooves extending about a circumference thereof and longitudinally disposed between the first end and second end; and
    a pair of O-rings, each configured to be installed about the adapter body and received in one of said grooves;
    wherein the adapter body is engageable between said welding torch head and said welding cup and is entirely disposed within said welding cup.

2. The adapter mechanism of claim 1, wherein an internal surface of the adapter body defines an engagement member between the first end and the second end for engaging the first end or the second end of the adapter body with the welding torch head.

3. The adapter mechanism of claim 2, wherein the engagement member comprises a threaded engagement member extending about a circumference of the internal surface and longitudinally disposed between the first end and second end of the adapter body.

4. The adapter mechanism of claim 1, wherein the adapter body is comprised of 6061 aluminum.

5. The adapter mechanism of claim 4, wherein the two grooves are in spaced apart relation to one another about the external surface of the adapter body, each of the grooves having a radius of between about 1.7 and about 16 millimeters and being configured to receive the O-rings.

6. The adapter mechanism of claim 1, wherein the adapter body comprises a length of between about 10 and about 25 millimeters, an internal diameter of between about 10 and about 19 millimeters, and an external diameter of between about 12 and about 21 millimeters.

7. A system for a welding apparatus, comprising:
    a welding cup having opposed first and second ends;
    a hollow tubular adapter body extending longitudinally from a first end to a second end, an external surface of the adapter body defining a pair of grooves extending about a circumference thereof and longitudinally disposed between the first end and second end; and
    a pair of O-rings, each configured to be installed about the adapter body and received in each of the grooves;
    wherein the first end or the second end of the adapter body is engageable with a welding torch head and wherein one of the first and second ends of the welding cup is configured to receive the other of the first end and the second end of the adapter body therein, the welding cup extending longitudinally along the adapter body such that the pair of O-rings is disposed between the adapter body and the welding cup and said adapter body is entirely disposed internally within said welding cup.

8. The system of claim 7, wherein the welding cup is comprised of a glass, a sapphire, a borosilicate, a quartz, or any other non-crystalline amorphous solid.

9. The system of claim 7, wherein one of the first end or the second end of the welding cup defines an orifice comprising a ½ inch diameter (#8), a 7/16 inch diameter (#7), a ⅜ inch diameter (#6), 5/16 inch diameter (#5), or a ¼ inch diameter (#4).

10. The system of claim 7, comprising a thermal spacer engaged with the second end of the welding cup for creating a seal between the second end of the welding cup and the welding torch head.

11. The system of claim 7, wherein the first end or the second end of the adapter body is engageable with the welding torch head of a tungsten inert gas (TIG) welding torch.

12. The system of claim 7, wherein an internal surface of the adapter body defines an engagement member between the first end and the second end for engaging the first end or the second end of the adapter body with the welding torch.

13. The system of claim 12, wherein the engagement member comprises a threaded engagement member extending about a circumference of the internal surface and longitudinally disposed between the first end and second end of the adapter body.

14. The system of claim 7, wherein the adapter body is comprised of 6061 aluminum.

15. The system of claim 7, wherein the welding cup is transparent.

16. The system of claim 15, wherein the pair of grooves are in spaced apart relation to one another about the external surface of the adapter body, each of the grooves having a radius of between about 1.7 and about 16 millimeters and being configured to receive the O-rings.

17. The system of claim 7, wherein the adapter body comprises a length of between about 10 and about 25 millimeters, an internal diameter of between about 10 and about 19 millimeters, and an external diameter of between about 12 and about 21 millimeters.

* * * * *